(12) United States Patent
Furushou et al.

(10) Patent No.: US 11,739,741 B2
(45) Date of Patent: Aug. 29, 2023

(54) CONTROL DEVICE FOR MOTOR UNIT

(71) Applicant: NIDEC TOSOK CORPORATION, Kanagawa (JP)

(72) Inventors: Masaya Furushou, Kanagawa (JP); Yasuhiro Shirai, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 259 days.

(21) Appl. No.: 17/017,709

(22) Filed: Sep. 11, 2020

(65) Prior Publication Data

US 2021/0095649 A1 Apr. 1, 2021

(30) Foreign Application Priority Data

Sep. 27, 2019 (JP) ................. 2019-177041

(51) Int. Cl.
  *F04B 17/03* (2006.01)
  *B60W 10/30* (2006.01)
  (Continued)

(52) U.S. Cl.
  CPC ............. *F04B 17/03* (2013.01); *B60W 10/30* (2013.01); *F04B 49/02* (2013.01); *F16H 57/0436* (2013.01); *B60L 2240/36* (2013.01)

(58) Field of Classification Search
  CPC ......... F04B 17/03; F04B 49/02; B60W 10/30; F16H 57/0436; F16H 57/0413; F16H 57/0417; F16H 57/043; F16H 57/045; F16H 57/0457; F16H 57/0483; F16H 57/0441; F16H 57/0476; F16H 2200/0021; F16H 57/0434; F16H 57/0435; B60L 2240/36; B60K 11/02; B60K 2001/006; B60K 1/00;
  (Continued)

(56) References Cited

U.S. PATENT DOCUMENTS 5,156,579 A * 10/1992 Wakuta ............. H02K 5/18
  475/159
5,708,336 A * 1/1998 Eyerly .............. H02H 7/0852
  318/471

(Continued)

FOREIGN PATENT DOCUMENTS

JP  2005245085 A  *  9/2005
JP  2012031832 A  *  2/2012
  (Continued)

*Primary Examiner* — Sizo B Vilakazi
*Assistant Examiner* — Brian R Kirby
(74) *Attorney, Agent, or Firm* — JCIPRNET (57) ABSTRACT

A control device for a motor unit provided in a vehicle is disclosed. The motor unit includes a motor including multiple coils provided side by side around a motor axis; a transmission mechanism transmitting power of the motor to an axle; a housing housing the motor and the transmission mechanism; an electric oil pump delivering oil stored in the housing; and a coil temperature sensor detecting a temperature of the coil. The control device includes a motor controller driving and controlling the motor; and a pump controller driving and controlling the electric oil pump. The pump controller estimates an oil temperature according to an ambient temperature and the temperature of the coil, and determines a start timing of the electric oil pump based on an estimated oil temperature.

11 Claims, 7 Drawing Sheets

(51) Int. Cl.
*F16H 57/04* (2010.01)
*F04B 49/02* (2006.01)

(58) Field of Classification Search
CPC .......... B60K 2001/001; B60Y 2306/03; B60Y 2200/91
See application file for complete search history.

(56) References Cited

U.S. PATENT DOCUMENTS

| | | | | |
|---|---|---|---|---|
| 6,854,881 | B2* | 2/2005 | Nada | B60K 6/445 374/E7.042 |
| 8,013,565 | B2* | 9/2011 | Miura | H02P 23/14 318/473 |
| 8,038,412 | B2* | 10/2011 | Durtschi | F04B 49/00 417/32 |
| 9,233,614 | B2 | 1/2016 | Mamura et al. | |
| 2002/0006154 | A1* | 1/2002 | Nada | G01K 7/42 374/E7.042 |
| 2010/0187042 | A1* | 7/2010 | Murahashi | F16H 57/0434 184/6.3 |
| 2010/0187044 | A1* | 7/2010 | Nabeshima | B60B 11/06 184/26 |
| 2011/0095717 | A1* | 4/2011 | Takizawa | H02P 29/62 318/473 |
| 2014/0062184 | A1* | 3/2014 | Rao | B60L 15/20 307/10.1 |
| 2015/0129345 | A1 | 5/2015 | Suzuki et al. | |
| 2015/0184577 | A1* | 7/2015 | Suzuki | F04D 15/0077 417/44.1 |
| 2016/0233814 | A1* | 8/2016 | Okamoto | F04C 15/0096 |
| 2017/0294865 | A1* | 10/2017 | Inokuma | H02P 6/12 |
| 2017/0370276 | A1* | 12/2017 | Nakai | F01P 11/02 |

FOREIGN PATENT DOCUMENTS

| | | |
|---|---|---|
| JP | 2012057645 | 3/2012 |
| JP | 5834509 | 12/2012 |
| JP | 2014000848 | 1/2014 |
| JP | 2014117006 | 6/2014 |
| JP | 2017206087 A * | 11/2017 |
| JP | 2018192862 | 12/2018 |
| JP | 2018204769 | 12/2018 |
| JP | 2019129577 | 8/2019 |

* cited by examiner

CONTROL DEVICE FOR MOTOR UNIT

CROSS-REFERENCE TO RELATED APPLICATIONS

The present invention claims priority under 35 U.S.C. § 119 to Japanese Application No. 2019-177041, filed on Sep. 27, 2019, the entire content of which is incorporated herein by reference.

FIELD OF THE INVENTION

The disclosure relates to a control device for a motor unit.

BACKGROUND

A conventional motor unit for driving a vehicle is known. For example, a related structure has been proposed to include an electric oil pump, which circulates cooling oil stored in a housing. In order to deal with a variation in viscous resistance caused by a change in an oil temperature, an oil-temperature-based driving control is employed in the electric oil pump.

However, in order to reduce size and cost, a temperature sensor for detecting the oil temperature may not be equipped in the motor unit. In this kind of motor unit, conventional control methods may not be applied, and thus driving control of the electric oil pump becomes difficult.

In particular, in a low temperature environment where a self-starting process of the electric oil pump is limited, if the electric oil pump is activated at an inappropriate timing, the electric oil pump may not be activated, and it may be determined that the electric oil pump is defective. Thus, in the low temperature environment, it is extremely difficult to perform adequate driving control of the electric oil pump without referring to the oil temperature.

SUMMARY

An exemplary embodiment of the disclosure provides a control device for a motor unit provided in a vehicle. The motor unit includes: a motor including multiple coils provided side by side around a motor axis; a transmission mechanism transmitting power of the motor to an axle; a housing housing the motor and the transmission mechanism; an electric oil pump delivering oil stored in the housing; and a coil temperature sensor detecting a temperature of the coil. The control device includes: a motor controller driving and controlling the motor; and a pump controller driving and controlling the electric oil pump. The pump controller estimates an oil temperature according to an ambient temperature and the temperature of the coil, and determines a start timing of the electric oil pump according to an estimated oil temperature.

The above and other elements, features, steps, characteristics and advantages of the disclosure will become more apparent from the following detailed description of the preferred embodiments with reference to the attached drawings.

DETAILED DESCRIPTION

Figure 1:
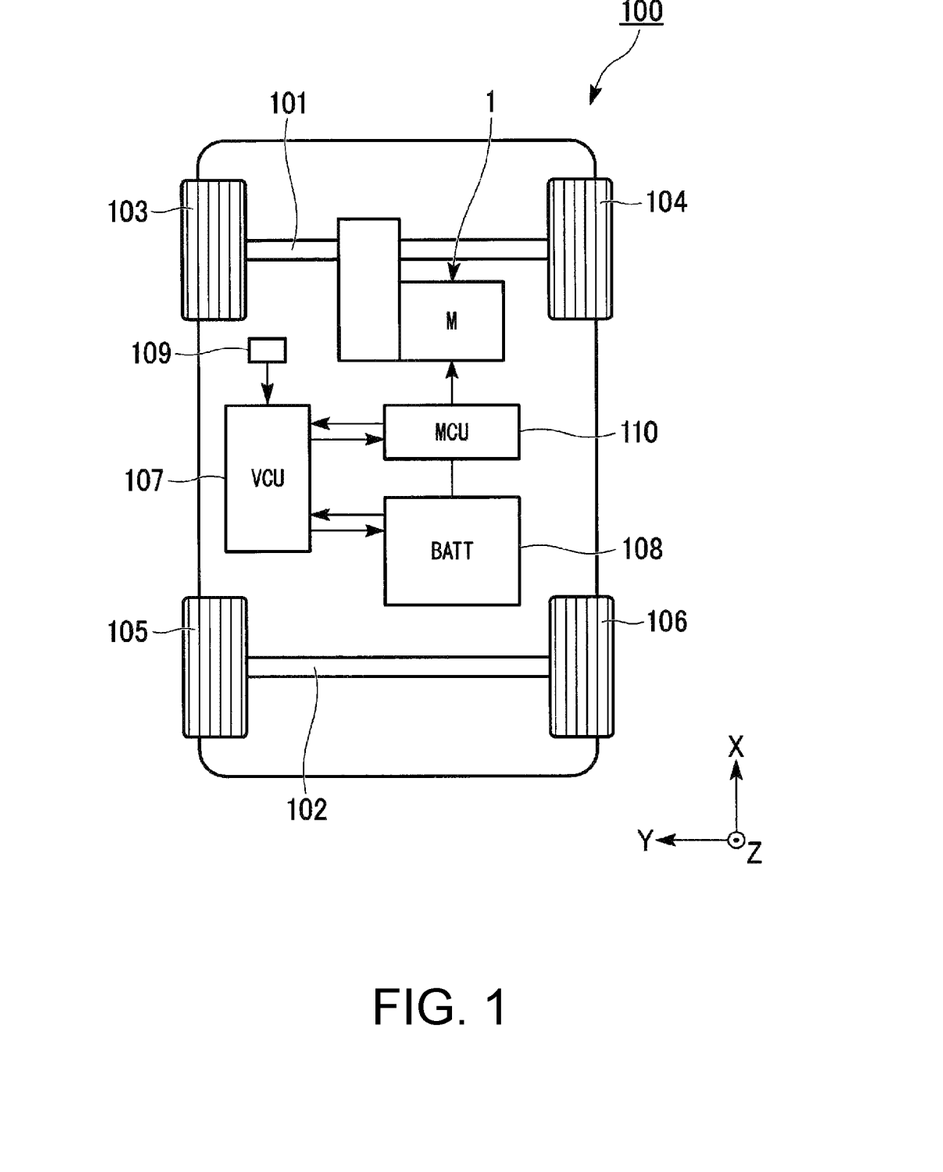
FIG. 1 is a schematic diagram showing a vehicle including a motor unit.

FIG. 1 is a schematic diagram showing a vehicle including a motor unit for driving the vehicle according to an exemplary embodiment of the disclosure.

A vehicle 100 includes a motor unit 1; axles 101, 102; front wheels 103, 104, rear wheels 105, 106; a vehicle control device 107 (also marked as VCU in the drawings); a battery 108; an ambient temperature sensor 109; and a motor control device 110 (also marked as MCU in the drawings).

The motor unit 1 drives the front wheels 103, 104 through the axle 101. The motor unit 1 is driven and controlled by the motor control device 110. The motor control device 110 is connected to the vehicle control device 107 and the battery 108. The vehicle control device 107 collects signals from each part of the vehicle 100 and controls the entire vehicle 100. The motor control device 110 controls the motor unit 1 according to a control signal received from the vehicle control device 107.

In the following description, a gravity direction is defined and described based on a positional relationship when the motor unit 1 is equipped on the vehicle located on a horizontal road surface. Further, in the drawings, an XYZ coordinate system is appropriately shown as a three-dimensional orthogonal coordinate system. In the XYZ coordinate system, a Z-axis direction represents a vertical direction (i.e., an up-down direction), wherein a +Z direction (opposite to the gravity direction) is towards an upper side, and a −Z direction (the gravity direction) is towards a lower side. In addition, an X-axis direction is a direction orthogonal to the Z-axis direction and represents a front-rear direction of the vehicle equipped with the motor unit 1, wherein a +X direction is towards a front side of the vehicle, and a −X direction is towards a rear side of the vehicle. A Y-axis direction is a direction orthogonal to both the X-axis direction and the Z-axis direction, and is a width direction (left-right direction) of the vehicle.

In the following description, unless otherwise specified, a direction (the Y-axis direction) parallel to a motor axis J2 of a motor 2 is simply referred to as the "axial direction," and a radial direction centered around the motor axis J2 is simply referred to as the "radial direction," and a circumferential direction centered around the motor axis J2 is simply referred to as the "circumferential direction." In addition, the above-mentioned term of "direction parallel to . . . " is further interpreted as "direction substantially parallel to . . . " herein. Similarly, the above-mentioned term of "direction orthogonal to . . . " is further interpreted as "direction substantially orthogonal to . . . " herein.

Figure 2:
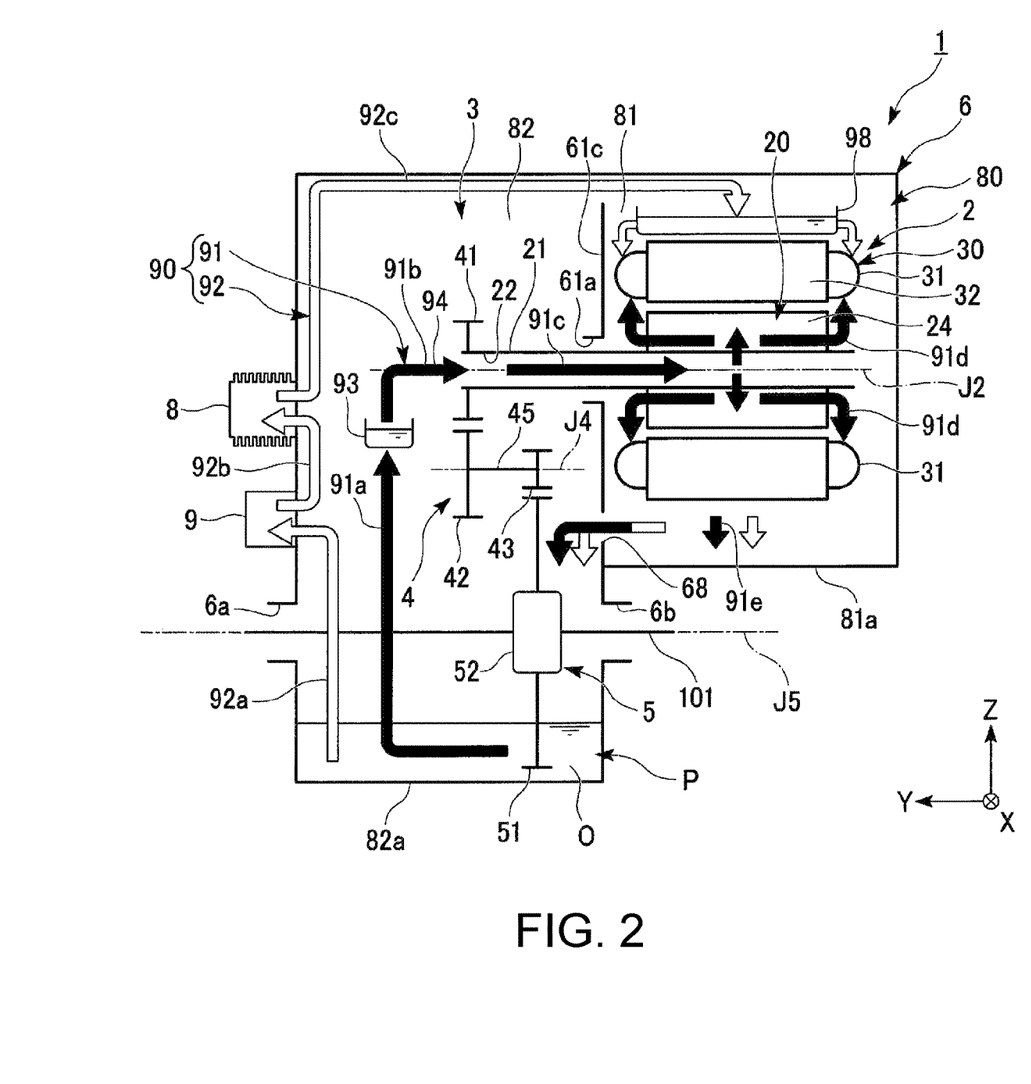
FIG. 2 is a schematic diagram showing a schematic configuration of the motor unit.

As shown in FIG. 2, the motor unit 1 includes the motor 2, a transmission mechanism 3, a housing 6, an oil cooler 8 and an electric oil pump 9. The motor unit 1 also includes oil O and an oil path 90 which supplies the oil O to the motor 2 in the housing 6. The motor unit 1 may further include a parking mechanism.

The motor 2 includes a rotor 20 rotating around the motor axis J2 which extends in the horizontal direction, and includes a stator 30 located on the radial direction outer side of the rotor 20. The motor 2 is an inner rotor type motor.

The rotor 20 includes a shaft 21 and a rotor body 24. The rotor body 24 includes a rotor core and a rotor magnet. The shaft 21 is centered around the motor axis J2 extending in the horizontal direction along the width direction of the vehicle (Y-axis direction). The shaft 21 includes a hollow part 22 inside. That is, the shaft 21 is a hollow shaft having an inner circumferential surface extending along the motor axis J2.

The stator 30 includes a stator core 32, a coil 31 and an insulator (not shown) interposed between the stator core 32 and the coil 31. The stator 30 is held by the housing 6. The stator core 32 has a cylindrical or substantially cylindrical shape surrounding the rotor 20. The stator core 32 has a core back in an annular or substantially annular shape as viewed from the axial direction, and multiple teeth extending toward the radial direction inner side from an inner circumferential surface of the core back. The coil 31 is defined by a coil wire wound around slots located between the teeth.

The transmission mechanism 3 includes a deceleration device 4 and a differential device 5. The deceleration device 4 is connected to the rotor 20 of the motor 2. The differential device 5 is connected to the deceleration device 4. The differential device 5 is connected to the axle 101. The axle 101 may rotate around a differential axis J5.

The housing 6 has a housing space 80 inside. The motor 2, the deceleration device 4 and the differential device 5 are housed in the housing space 80. The oil O is utilized for lubricating the deceleration device 4 and the differential device 5 and cooling the motor 2. The oil O accumulates in a region on the vertical direction lower side of the housing space 80. Since the oil O functions as lubricating oil and cooling oil, oil equivalent to an automatic transmission fluid (ATF) having low viscosity is preferably employed. The oil path 90 is a path for the oil O which supplies the oil O from the region on the lower side of the housing space 80 to the motor 2. The oil path 90 includes a first oil path 91 and a second oil path 92.

In addition, the term "oil path" mentioned in this specification means the path for the oil O circulating in the housing space 80. Accordingly, the term "oil path" is not only limited to a "flow path" defined by a steady flow of oil constantly flowing in one direction, but is broadened to a concept including a path (e.g., a reservoir) which temporarily stores oil and a path where oil drips down.

The housing 6 has a partition wall 61 inside. The partition wall 61 divides the housing space 80 into a motor chamber 81 and a gear chamber 82. The motor chamber 81 houses the motor 2. The gear chamber 82 houses the deceleration device 4 and the differential device 5.

The housing 6 includes an oil sump P in which the oil O accumulates in the lower region of the housing space 80. According to the exemplary embodiment of the disclosure, the oil sump P is located in a region on the lower side of the gear chamber 82. A bottom 81a of the motor chamber 81 is located above a bottom 82a of the gear chamber 82. In addition, the partition wall 61 dividing the motor chamber 81 and the gear chamber 82 includes a partition wall opening 68 located at a lower portion of the partition wall 61. The partition wall opening 68 penetrates the partition wall 61 along a thickness direction of the partition wall 61. The partition wall opening 68 connects the motor chamber 81 and the gear chamber 82. Through the partition wall opening 68, the oil O accumulated in a region on the lower side of the motor chamber 81 moves to the gear chamber 82.

A portion of the differential device 5 is submerged into the oil sump P. The oil O accumulated in the oil sump P is raised by an operation of the differential device 5, and a portion of the raised oil is supplied to the first oil path 91, and a portion of the raised oil is diffused in the gear chamber 82. The oil O diffused in the gear chamber 82 is supplied to respective gears of the deceleration device 4 and the differential device 5 in the gear chamber 82 to spread the oil O on tooth surfaces of the gears. The oil O used by the deceleration device 4 and the differential device 5 drips from the gears and is collected in the oil sump P located on the lower side of the gear chamber 82. A capacity of the oil sump P of the housing space 80 is designed such that a portion of a bearing of the differential device 5 is submerged in the oil O when the motor unit 1 is stopped.

The housing 6 defines an outer frame of the motor unit 1. The housing 6 includes two axle insertion holes 6a, 6b penetrated by the axle 101 supporting the front wheels 103, 104. The housing 6 has a first reservoir 93 and a guide flow path 94 inside. The first reservoir 93 stores the oil O raised by the differential device 5. The guide flow path 94 extends from the first reservoir 93 to the shaft 21 of the motor 2. The guide flow path 94 is a flow path guiding the oil O received by the first reservoir 93 toward the inner side of the hollow part 22 of the shaft 21.

The deceleration device 4 transmits a torque output from the motor 2 to the differential device 5. The deceleration device 4 includes a first gear 41, a second gear 42, a third gear 43 and an intermediate shaft 45. The torque output from the motor 2 is transmitted to a ring gear 51 of the differential device 5 through the shaft 21 of the motor 2, the first gear 41, the second gear 42, the intermediate shaft 45 and the third gear 43. A gear ratio of each gear, the number of gears, etc., may be variously adjusted based on a required deceleration ratio. According to the exemplary embodiment of the disclosure, the deceleration device 4 is a deceleration machine of a parallel shaft gear type, in which shaft cores of the gears are provided in parallel.

The first gear 41 is fixed to one end of the shaft 21. The first gear 41 rotates around the motor axis J2 together with the shaft 21. The intermediate shaft 45 extends along an intermediate axis J4 parallel to the motor axis J2. The intermediate shaft 45 has a cylindrical or substantially cylindrical shape centered on the intermediate axis J4. The intermediate shaft 45 rotates around the intermediate axis J4.

The second gear 42 and the third gear 43 are located at two ends of the intermediate shaft 45 in the axial direction. The second gear 42 and the third gear 43 are connected by the intermediate shaft 45. The second gear 42 and the third gear 43 rotate around the intermediate axis J4. The second gear 42 engages with the first gear 41. The third gear 43 engages with the ring gear 51 of the differential device 5.

The differential device 5 transmits the torque output from the motor 2 to the axle 101. When the vehicle turns, the differential device 5 absorbs a speed difference between the left and right wheels, and uniformly transmits the torque to the axle 101 of the left and right wheels. The differential device 5 includes the ring gear 51 and a differential mechanism 52. For example, the differential mechanism 52 includes a gear housing, a pair of pinion gears, a pinion shaft, a pair of side gears, and the like. The axle 101 is connected to the pair of side gears of the differential mechanism 52. The ring gear 51 rotates around the differential axis J5 parallel to the motor axis J2. The torque output from the motor 2 is transmitted to the ring gear 51 through the deceleration device 4. The ring gear 51 is fixed to an outer periphery of the gear housing of the differential mechanism 52.

The oil path 90 is configured to extend across the motor chamber 81 and the gear chamber 82 of the housing space 80. The oil path 90 is a path for the oil O which guides the oil O from the oil sump P to the motor 2, and then back to the oil sump P. The oil path 90 includes the first oil path 91 extending over an inside of the motor 2 and the second oil path 92 extending over an outside of the motor 2. The oil O flows through the first oil path 91 and the second oil path 92, and thereby cools the motor 2 from the inside and the outside.

Both the first oil path 91 and the second oil path 92 are paths which supply the oil O from the oil sump P to the motor 2, and then collect the oil O back to the oil sump P. In the first oil path 91 and the second oil path 92, the oil O drips from the motor 2 and accumulates in a region on the lower side of the motor chamber. The oil O accumulated in the region on the lower side of the motor chamber 81 moves to the oil sump P located on the lower side of the gear chamber 82 through the partition wall opening 68.

The first oil path 91 includes a raising path 91a, a shaft supplying path 91b, an in-shaft path 91c, an in-rotor path 91d and a storage path 91e. The first reservoir 93 is provided in the first oil path 91.

The oil O is raised from the oil sump P by the differential device 5, and flows into the first reservoir 93 through the raising path 91a. The oil O flows from the first reservoir 93 through the shaft supplying path 91b into the hollow part 22 of the shaft 21. Next, the oil O passes through the in-shaft path 91c in the shaft 21, and flows into the rotor body 24 via a through hole (not shown) of the shaft 21. The oil O passes through the in-rotor path 91d, and jets to the outer side of two ends of the rotor body 24 in the axial direction. The oil O scatters to the radial direction outer side due to a centrifugal force caused by rotation of the rotor 20, and cools the coil 31 of the stator 30. The oil O is dripped to the lower side from the motor 2, and moves to the oil sump P through the storage path 91e.

The second oil path 92 includes a first flow path 92a, a second flow path 92b and a third flow path 92c. The electric oil pump 9, the oil cooler 8 and a second reservoir 98 are provided in the second oil path 92. In the second oil path 92, the oil O sequentially passes through the first flow path 92a, the electric oil pump 9, the second flow path 92b, the oil cooler 8, the third flow path 92c and the second reservoir 98, and thereafter is supplied to the motor 2.

The electric oil pump 9 pumps up the oil O from the oil sump P through the first flow path 92a, and discharges the oil O into the second flow path 92b. The oil O flows from the second flow path 92b through the oil cooler 8 and the third flow path 92c into the second reservoir 98. The oil O is supplied to the motor 2 from the second reservoir 98.

Hereinafter, control of the electric oil pump in the motor unit 1 will be described with reference to FIGS. 3 to 9.

Figure 3:
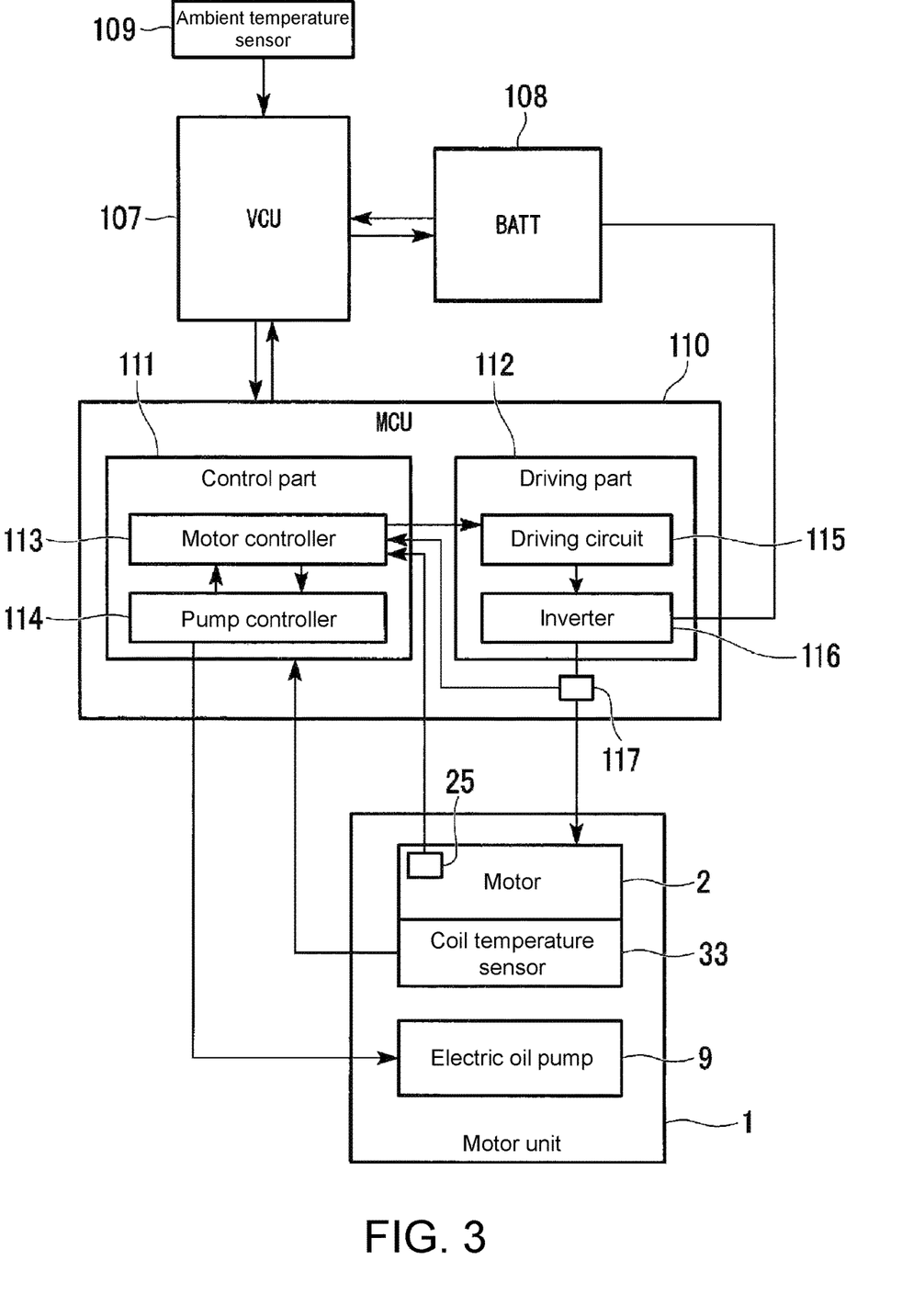
FIG. 3 is a functional block diagram of the motor unit.

As shown in FIG. 3, the motor control device 110 which is a control device for the motor unit 1 includes a control part 111, a driving part 112 and a current sensor 117. The control part 111 includes a motor controller 113 and a pump controller 114. The driving part 112 includes a driving circuit 115 and an inverter 116. The motor unit 1 includes the motor 2 and the electric oil pump 9. The motor 2 includes a coil temperature sensor 33 measuring a temperature of the coil 31 and a rotation sensor 25 detecting a rotational direction position of the rotor 20.

The motor controller 113 of the control part 111 is connected to the driving part 112, the rotation sensor 25 of the motor 2, and the current sensor 117 provided in the motor control device 110. The motor controller 113 drives and controls the motor 2 by the driving part 112 according to an instructive signal received from the vehicle control device 107 which is a superior device. According to the exemplary embodiment of the disclosure, the motor controller 113 acquires a rotation angle of the rotor 20 from the rotation sensor 25, and performs rotation control of the rotor 20. The motor controller 113 detects a current flowing in the coil 31 of the motor 2 by the current sensor 117, and performs current feedback control.

The pump controller 114 is connected to the electric oil pump 9 of motor unit 1. The pump controller 114 drives and controls the electric oil pump 9. The pump controller 114 and the motor controller 113 communicate with each other. That is, the pump controller 114 may acquire information of the motor 2 from the motor controller 113, and the motor controller 113 may acquire information of the electric oil pump 9 from the pump controller 114.

Although the motor control device 110 includes both the motor controller 113 and the pump controller 114 according to the exemplary embodiment of the disclosure, the motor controller 113 and the pump controller 114 may be provided as independent controllers.

The driving circuit 115 of the driving part 112 is connected to the motor controller 113 and the inverter 116. According to the exemplary embodiment of the disclosure, the driving circuit 115 generates a pulse width modulation (PWM) control signal by comparing an instructive voltage signal output from the motor controller 113 and a triangular wave of a carrier. The driving circuit 115 outputs the PWM control signal to the inverter 116. The inverter 116 is driven by the PWM control signal input from the driving circuit 115. The inverter 116 converts DC power of the battery 108 into three-phase AC power which drives the motor 2.

According to the motor control device 110 of the exemplary embodiment of the disclosure, the pump controller 114 estimates a temperature of the oil O based on an ambient temperature and a coil temperature, and determines a start timing of the electric oil pump 9 based on the temperature of the oil O. Specifically, the pump controller 114 performs steps S1 to S6 shown in FIG. 4.

Figure 4:
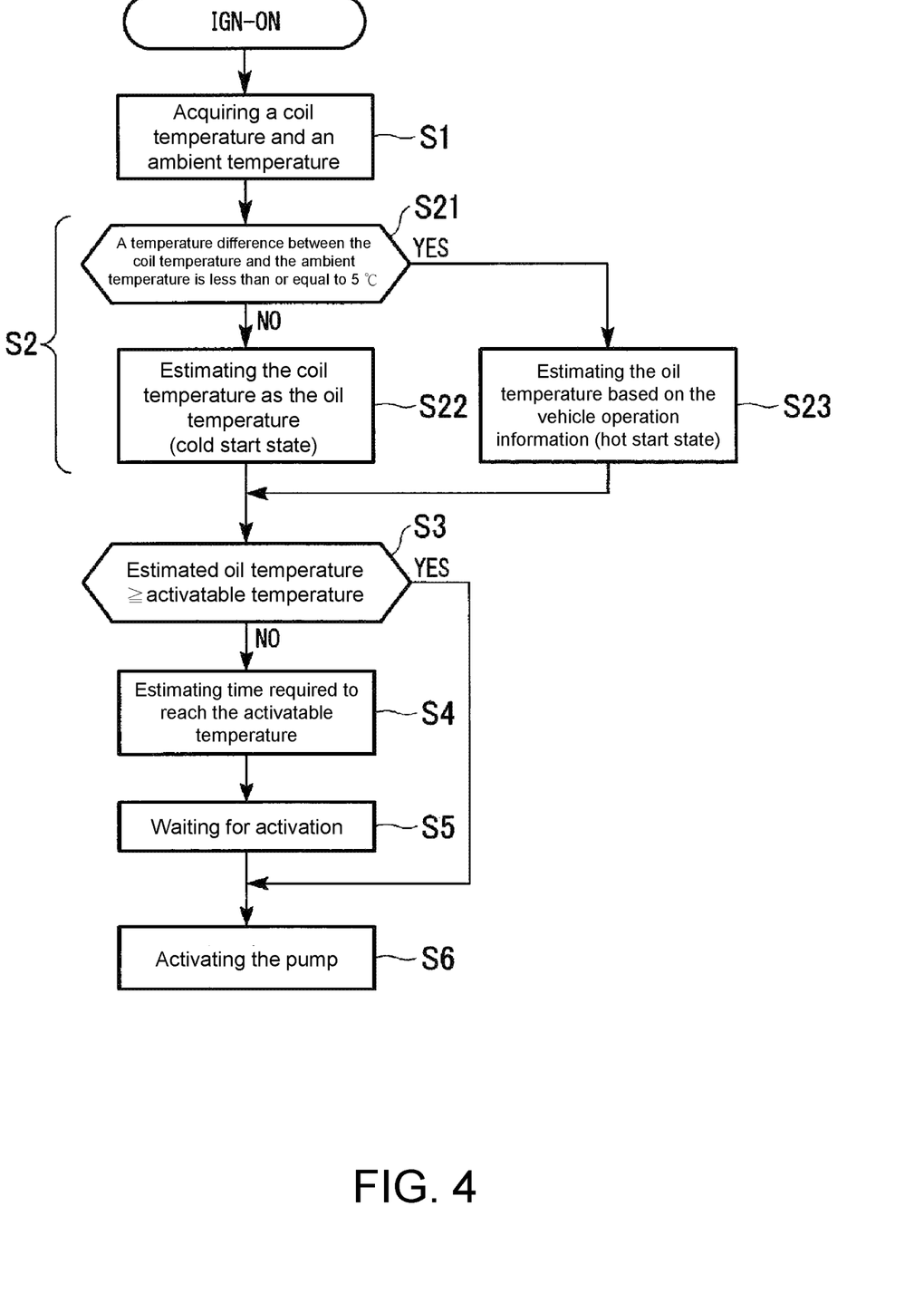
FIG. 4 is a flowchart of operations of the motor unit when an electric oil pump is activated.

In the step S1, the pump controller 114 acquires the coil temperature of the coil 31 and the ambient temperature of the vehicle 100 when an ignition switch of the vehicle 100 is turned on and the motor unit 1 is electrically energized. The coil temperature may be acquired from the coil temperature sensor 33 of the motor 2. The ambient temperature detected by the ambient temperature sensor 109 provided in the vehicle 100 is acquired by the vehicle control device 107. The pump controller 114 acquires the ambient temperature from the vehicle control device 107.

In the step S2, the pump controller 114 estimates a start oil temperature according to the coil temperature and the ambient temperature.

Regarding the estimation of the oil temperature, in the step S21, the pump controller 114 first compares the coil temperature and the ambient temperature. If a result of the comparison shows that the coil temperature and the ambient temperature are substantially equal to each other, the pump controller 114 determines that the vehicle 100 is activated from a cold start state since the oil O has sufficiently cooled down. A criterion for determining the cold start state is that a temperature difference between the coil temperature and the ambient temperature is within a range in which it may be determined that the vehicle is in a cold state. For example, in a case where the difference between the coil temperature and the ambient temperature is about 5 degrees Celsius (° C.) or less, for example, it may be determined that the case conforms to the cold start state. The temperature difference serving as the criterion for determining the cold start state may be adjusted for different models of the motor unit.

If the pump controller 114 determines that the case conforms to the cold start state, the step S22 is performed. The pump controller 114 estimates that the start oil temperature is substantially equal to the coil temperature. The estimated oil temperature Toil_start at the start a present operation and a coil temperature Tcoil_start at the start of the present operation have a relationship shown in the following equation (1).

$$Toil\_start = Tcoil\_start \qquad (1)$$

On the other hand, if the difference between the coil temperature and the ambient temperature exceeds the temperature difference (e.g., 5° C.) serving as the criterion for determining the cold start state, it is determined as a hot start state in which the vehicle 100 has been started before the temperature of the oil O completely cools down. In such a case, it is estimated that the temperature of the oil O does not drop to the ambient temperature. When a hot start state is determined, the pump controller 114 estimates the start oil temperature of the present operation according to the estimated oil temperature at an end of a previous operation, a vehicle soak time of the vehicle 100, the coil temperature and the ambient temperature.

Figure 5:
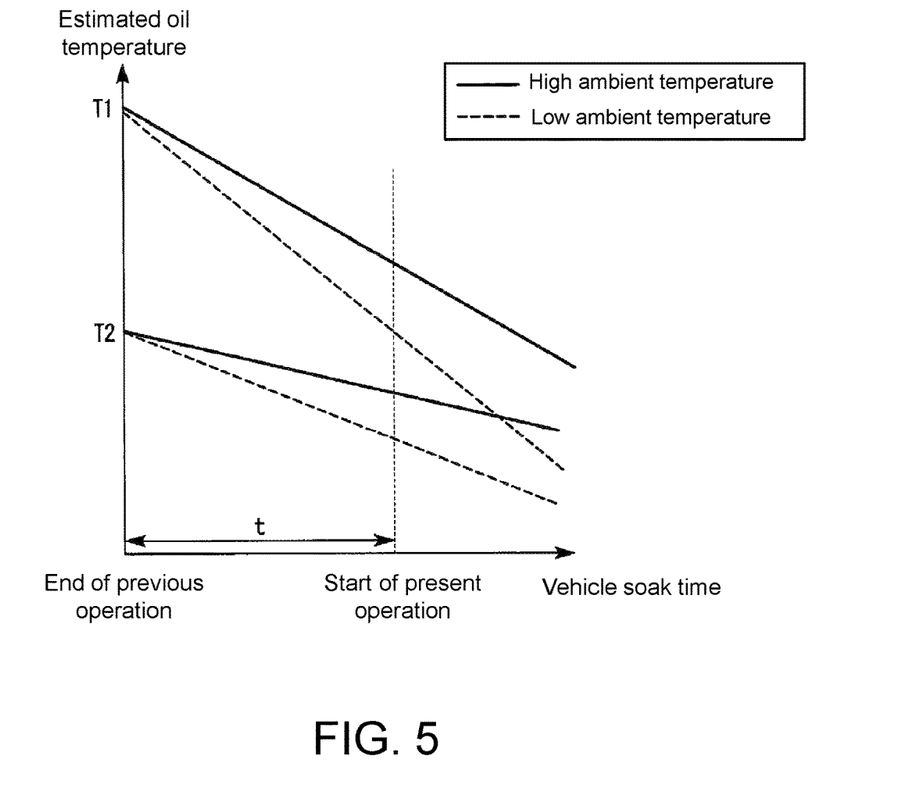
FIG. 5 is a diagram illustrating a relationship between the vehicle soak time and the estimated oil temperature.

FIG. 5 is a diagram illustrating a relationship between the vehicle soak time and the estimated oil temperature.

As shown in FIG. 5, the oil temperature of the motor unit 1 decreases over the vehicle soak time from an estimated oil temperature T1 or T2 at an end of the previous operation, and approaches the ambient temperature. A slope of a variation of the oil temperature changes with the ambient temperature. That is, when the ambient temperature is high, the decrease of the oil temperature becomes gentle, and when the ambient temperature is low, the oil temperature quickly decreases.

In the vehicle 100 equipped with the motor unit 1, a post-operation cooling step for cooling the motor unit 1 is generally performed after an ignition is turned off. According to the exemplary embodiment of the disclosure, the electric oil pump 9 continues to operate even after the motor unit 1 is stopped, and circulates the oil in the motor unit 1. By performing this oil circulation operation, each part of the motor unit 1, the coil 31 particularly, is cooled. By performing the post-operation cooling step, each part of the motor unit 1 is cooled, and the oil temperature and the coil temperature become substantially equal. According to the exemplary embodiment of the disclosure, the estimated oil temperature at the end of the previous operation is an oil temperature estimated after the post-operation cooling step is performed. Therefore, an estimated oil temperature when the vehicle is stopped may be acquired by measuring the coil temperature after the post-operation cooling step is performed.

If the estimated oil temperature when the vehicle is stopped at the previous operation is denoted as Toil_stop, the vehicle soak time of the vehicle 100 is denoted as tsoak, and an average value of the ambient temperature is denoted as Tout_avg, the estimated oil temperature Toil_start at the start of the present operation may be calculated according to the following equation (2). In addition, the average value Tout_avg of the ambient temperature is an average value of an ambient temperature at the end of the previous operation and an ambient temperature at a start of the present operation. Also, the term "a" described in the equation (2) is a constant which is experimentally obtained.

$$Toil\_start = Toil\_stop - (a/Tout\_avg) \cdot tsoak \qquad (2)$$

In order to determine the constant "a" in the equation (2), after the post-operation cooling step of the vehicle 100 completes, an experiment for observing a variation of the oil temperature with respect to the soak time is carried out under various ambient temperatures. The constant "a" may be accurately determined by collecting data under a large number of different environments under various ambient temperatures.

Next, in the step S3, the pump controller 114 compares the estimated oil temperature Toil_start at the start of the present operation with an activatable temperature Teop_ok of the electric oil pump 9. When the estimated oil temperature Toil_start is substantially equal to or higher than the activatable temperature Teop_ok, the process proceeds to the step S6, and the pump controller 114 activates the electric oil pump 9.

On the other hand, if the estimated oil temperature Toil_start is lower than the activatable temperature Teop_ok, the process proceeds to the step S4, and the pump controller 114 estimates a temperature rising time required for the estimated oil temperature Toil to reach the activatable temperature Teop_ok, and determines an activation waiting time of the electric oil pump 9 according to the temperature rising time. In the step S5, the pump controller 114 waits for activation of the electric oil pump 9 for the activation waiting time. After waiting for the predetermined time, the process proceeds to the step S6, and the pump controller 114 activates the electric oil pump 9.

Hereinafter, operations regarding the activation waiting of the electric oil pump 9 will be described in detail with reference to FIGS. 6 to 9.

Figure 6:
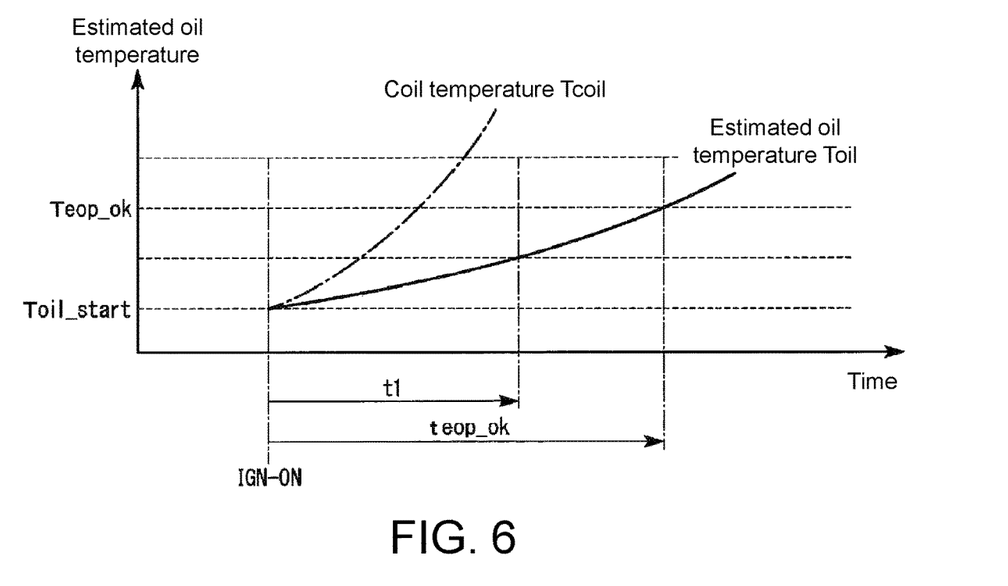
FIG. 6 is a diagram illustrating variations over time in the coil temperature and the estimated oil temperature in a cold start state.

FIG. 6 is an explanatory diagram conceptually illustrating variations over time in the coil temperature and the estimated oil temperature in a cold start state.

In the step S21, if it is determined as the cold start state, as shown in FIG. 6, the estimated oil temperature Toil_start at the start of the present operation is estimated to be substantially equal to the coil temperature Tcoil_start at the start of the present operation. The electric oil pump 9 is not activated when the ignition is turned on.

When the motor 2 of the motor unit 1 starts the rotation after the ignition is turned on, the coil temperature Tcoil_starts rising since the coil 31 is electrically energized. At this moment, although the electric oil pump 9 is not activated, the transmission mechanism 3 of the motor unit 1 raises the oil O from the oil sump P by the ring gear 51 of the differential device 5, and the oil O flows into the shaft 21 of the motor 2. The oil in the shaft 21 is jetted to the coil 31 through the rotor body 24. As a result, the oil O circulating in the housing 6 contacts with the coil 31 and is heated by the coil 31, whereby the oil temperature gradually rises.

Figure 7:
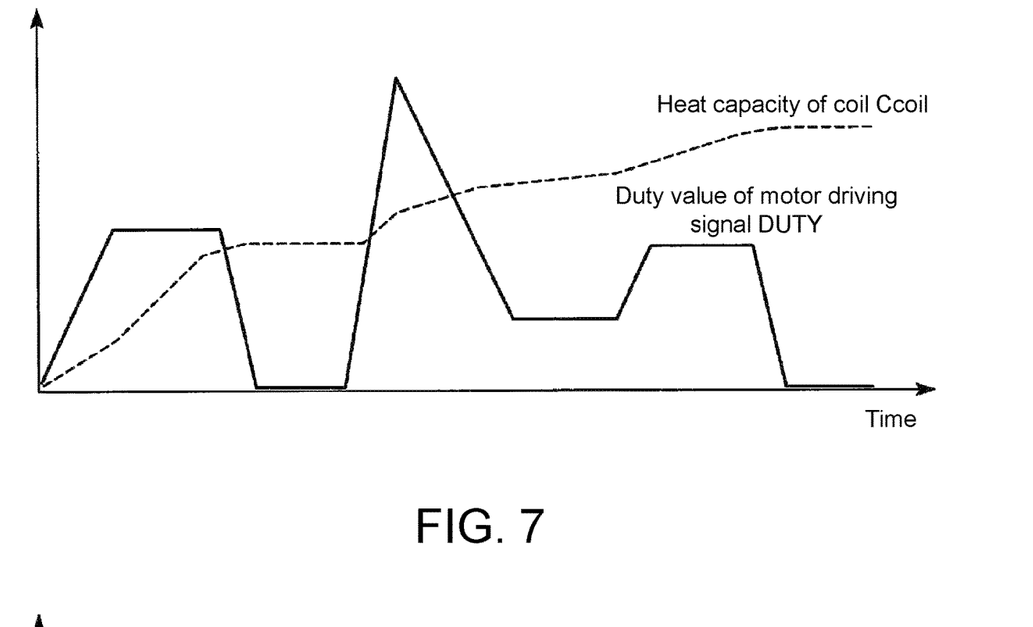
FIG. 7 is a diagram illustrating variations over time in a duty value of a motor driving signal and the heat capacity of the coil.

A temperature rising value (ΔToil) of the oil O caused by the contact with the coil 31 may be estimated according to an increase amount of a heat capacity Ccoil of the coil 31 and volume of the oil O contacting the coil 31 (oil circulation volume Voil). FIG. 7 is an explanatory diagram conceptually illustrating variations in a duty value of a motor driving signal and the heat capacity of the coil with respect to a driving time of the motor unit.

As shown in the equation (3), the heat capacity Ccoil of the coil 31 may be obtained by a function of an accumulated value Σduty of the duty value DUTY of the motor driving signal input from the coil 31 during a driving period of the motor unit 1. The pump controller 114 may obtain the duty value DUTY of the motor driving signal from the motor controller 113 at any time. In the following equation (3), b1 is a constant.

$$Ccoil = \int DUTY \cdot dt \quad (3)$$
$$\approx \sum DUTY \cdot \Delta t$$
$$= b1 \cdot \sum DUTY$$

Figure 8:
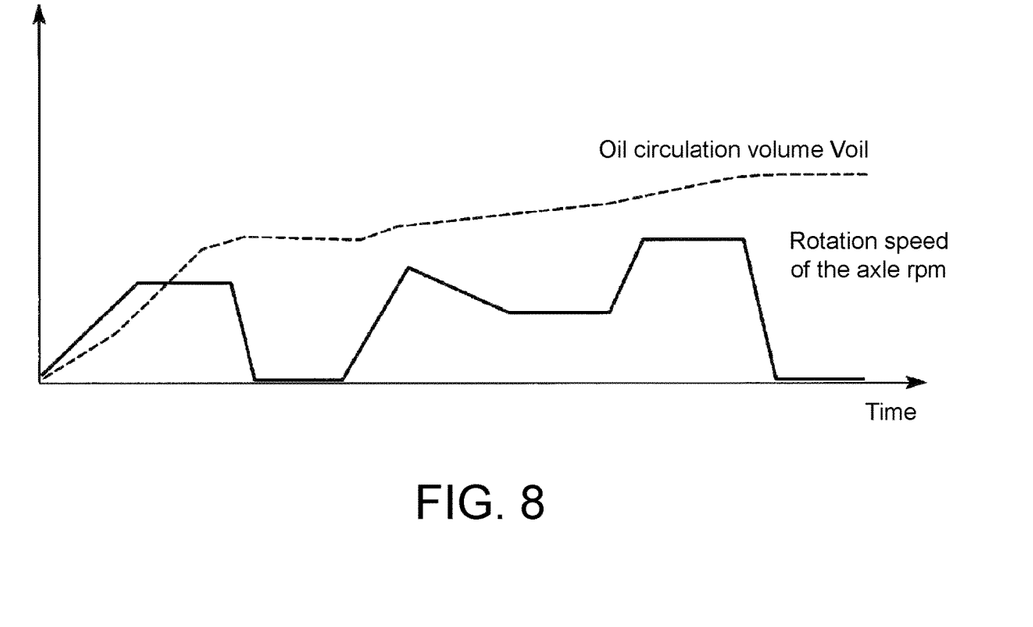
FIG. 8 is a diagram illustrating variations over time in the motor rotation speed and the oil circulation total volume.

The volume of the oil O jetted to the coil 31 may be considered to be the volume of oil which is raised by the ring gear 51 and guided to the shaft 21. A rotation speed of the ring gear 51 matches a rotation speed rpm of the axle 101. The oil circulation volume Voil, which is the total volume of the oil O circulating in the housing 6 due to the rotation of the ring gear 51, is proportional to the rotation speed rpm of the axle 101, as shown in the following equation (4). The pump controller 114 may obtain the rotation speed rpm of the axle 101 from the vehicle control device 107 at any time. In the following equation (4), b2 is a constant.

$$Voil = \int rpm \cdot dt \quad (4)$$
$$\approx \sum rpm \cdot \Delta t$$
$$= b2 \cdot \sum rpm$$

FIG. 8 is an explanatory diagram conceptually illustrating variations in the rotation speed rpm of the axle 101 and the oil circulation volume Voil with respect to the driving time of the motor unit. As shown in FIG. 8, the oil circulation volume Voil monotonically increases over the driving time of the motor unit 1.

Based on the foregoing, as shown in the following equation (5), the temperature rising value ΔToil of the oil since the start of the driving of the motor unit 1 may be expressed as a product of the heat capacity Ccoil of the coil and the oil circulation volume Voil. As shown in the equation (6), the constant b1 of the equation (3) and the constant b2 of the equation (4) are integrated into a constant b multiplied by a value obtained by accumulating a product of the duty value DUTY and the rotation speed rpm during the driving period. The constant b may be experimentally obtained.

$$\Delta Toil = b1 \cdot \sum DUTY \times b2 \cdot \sum rpm \quad (5)$$
$$= b \cdot \sum (DUTY \times rpm) \quad (6)$$

In order to determine the constant b in the equation (6), for example, the motor unit 1 is driven based on various duty values DUTY, and variations in the estimated oil temperature Toil with respect to the driving time under different conditions are observed. The constant b may be accurately determined by collecting data under a large number of duty value conditions.

The pump controller 114 estimates the temperature rising value ΔToil of the oil since the start of the driving of the motor unit 1 by calculating the duty value DUTY of the motor driving signal acquired from the motor controller 113 and the rotation speed rpm of the axle 101 acquired from the vehicle control device 107 according to the equation (6). As shown in the following equation (7), the pump controller 114 obtains the estimated oil temperature Toil of the present operation by adding the estimated oil temperature Toil_start at the start of the present operation and the temperature rising value ΔToil of the oil.

$$Toil=Toil\_start+\Delta Toil \quad (7)$$

The pump controller 114 estimates the temperature rising time teop_ok required for the estimated oil temperature Toil to reach to reach the activatable temperature Teop_ok according to a difference between the estimated oil temperature Toil of the present operation and the activatable temperature Teop_ok of the electric oil pump 9, and a rising value of the oil temperature per unit time. The pump controller 114 determines the temperature rising time teop_ok as an activation waiting time twait for the electric oil pump 9 to wait in an orbit. The rising value of the oil temperature per unit time is a value obtained by dividing the temperature rising value ΔToil of the oil by a driving time t1 of the motor unit 1.

$$twait=(Teop\_ok-Toil)/(\Delta Toil/t1) \quad (8)$$

In the step S5, the pump controller 114 waits for the activation of the electric oil pump 9 for the activation waiting time twait obtained according to the equation (8). After the waiting time lapses, the process proceeds to the step S6, and the pump controller 114 activates the electric oil pump 9.

According to the exemplary embodiment of the disclosure, although the temperature rising time teop_ok required for the estimated oil temperature Toil to reach the activatable temperature Teop_ok serves as the activation waiting time twait, the activation waiting time twait may be adjusted to be longer or shorter than the temperature rising time teop_ok based on practical conditions. That is, the activation waiting time twait may be determined according to the temperature rising time teop_ok, and the activation waiting time twait and the temperature rising time teop_ok are not necessarily equal.

Figure 9:
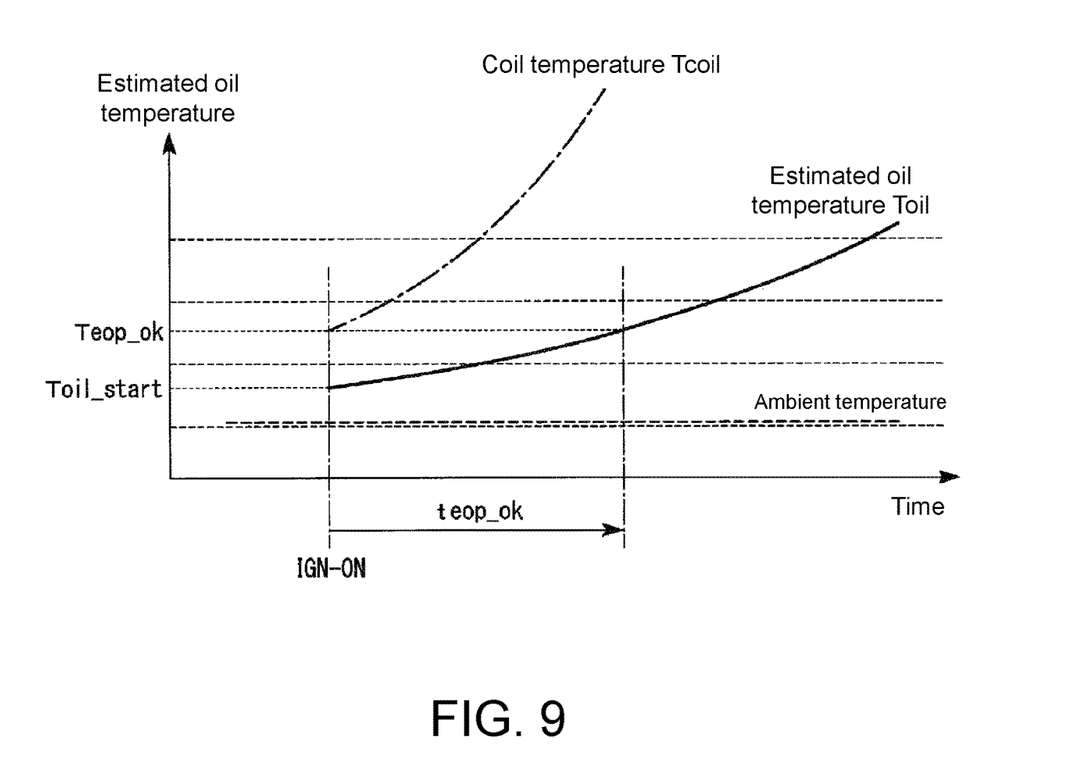
FIG. 9 is a diagram illustrating variations over time in the coil temperature and the estimated oil temperature in a hot start state.

Next, FIG. 9 is an explanatory diagram conceptually illustrating variations over time in the coil temperature and the estimated oil temperature in a hot start state.

In the step S21, if it is determined as the hot start state, as shown in FIG. 9, the estimated oil temperature Toil_start at the start of the present operation is estimated to be substantially higher than the ambient temperature. A magnitude relationship between the estimated oil temperature Toil_start at the start of the present operation and the coil temperature Tcoil is indefinite. In the hot start state, the electric oil pump 9 is not activated when the ignition is turned on.

When the motor 2 of the motor unit 1 starts the rotation after the ignition is turned on, the coil temperature Tcoil_starts rising since the coil 31 is electrically energized. In addition, the oil O is raised by the ring gear 51 of the differential device 5, and the temperature of the oil O starts rising due to the contact between the oil O and the coil 31.

The pump controller 114 uses the estimated oil temperature Toil_start at the start of the present operation estimated in the step S23 as an initial value of the oil temperature. Except for initial conditions of the estimated oil temperature, operations in the hot start state are identical to the foregoing operations in the cold start state. The pump controller 114 estimates the temperature rising time teop_ok required for the estimated oil temperature Toil to reach to the activatable temperature Teop_ok according to the difference between the estimated oil temperature Toil of the present operation and the activatable temperature Teop_ok of the electric oil pump 9 and the rising value of the oil temperature per unit time. The pump controller 114 estimates the activation waiting time twait to wait for the activation of the electric oil pump 9 according to the temperature rising time teop_ok.

In the step S5, the pump controller 114 waits for the activation of the electric oil pump 9 for the activation waiting time twait obtained according to the equation (8). After the waiting time lapses, the process proceeds to the step S6, and the pump controller 114 activates the electric oil pump 9.

According to the above-described motor control device 110 of the present exemplary embodiment of the disclosure, even though a temperature sensor for the oil O housed in the housing 6 of the motor unit 1 is not provided, the oil temperature may be estimated according to the coil temperature and the ambient temperature, and the start timing of the electric oil pump 9 may be determined according to the estimated oil temperature. Therefore, according to the motor unit 1 equipped with the motor control device 110 of the present exemplary embodiment, the electric oil pump 9 may be safely operated even in a low temperature environment where a self-starting process of the electric oil pump 9 is limited. As such, it is possible to improve the operational reliability of the motor unit 1 not including the temperature sensor for the oil. According to the vehicle 100 equipped with the motor unit 1, good operation reliability may be achieved in the low temperature environment.

According to the motor control device 110 of the present exemplary embodiment of the disclosure, the pump controller 114 estimates the temperature rising time teop_ok for the estimated oil temperature Toil to reach the activatable temperature Teop_ok if the estimated oil temperature Toil is lower than the activatable temperature Teop_ok of the electric oil pump 9, and determines the activation waiting time twait to wait for activation of the electric oil pump 9 according to the temperature rising time teop_ok. With this configuration, the electric oil pump 9 may be safely operated. In addition, since the motor control device 110 is aware of the waiting time lasting until the pump is activated, efficiency of motor control may be enhanced.

According to the motor control device 110 of the present exemplary embodiment of the disclosure, the pump controller 114 estimates the temperature rising time teop_ok according to data of a rising speed of the estimated oil temperature Toil obtained in the cold start state if the difference between the coil temperature Tcoil and the ambient temperature is less than about 5° C., for example. With this configuration, the start timing of the electric oil pump 9 activated from the cold state may be accurately controlled.

According to the motor control device 110 of the present exemplary embodiment of the disclosure, the pump controller 114 estimates the temperature rising time teop_ok according to the duty value DUTY of the motor driving signal (i.e., power consumption of the motor 2) and the oil circulation volume Voil of the motor unit 1. With this configuration, it is possible to more accurately estimate an oil temperature rise caused by heat generated by the motor 2, and estimation accuracy of the oil temperature is accordingly improved. In this way, the electric oil pump 9 may be more safely operated in the low temperature environment.

According to the motor control device 110 of the present exemplary embodiment of the disclosure, the pump controller 114 estimates the start oil temperature to be equal to the coil temperature if the difference between the coil temperature Tcoil and the ambient temperature is less than about 5° C., for example. With this configuration, the start oil temperature in the cold start state may be relatively accurately estimated.

According to the motor control device 110 of the present exemplary embodiment of the disclosure, the pump controller 114 estimates the start oil temperature Toil_start according to the estimated oil temperature Toil_stop when the vehicle is stopped, the vehicle soak time tsoak and the ambient temperature if the coil temperature Tcoil is higher than the ambient temperature by about 5° C. or more, for example. With this configuration, the start oil temperature in the hot start state may be relatively accurately estimated.

Features of the above-described preferred embodiments and the modifications thereof may be combined appropriately as long as no conflict arises. While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A control device for a motor unit provided in a vehicle, wherein the motor unit comprises:
 a motor comprising a plurality of coils provided side by side around a motor axis;
 a transmission mechanism transmitting power of the motor to an axle;
 a housing housing the motor and the transmission mechanism;
 an electric oil pump delivering oil stored in the housing; and
 a coil temperature sensor detecting a temperature of the coil, the control device comprising:
 a motor controller driving and controlling the motor; and
 a pump controller driving and controlling the electric oil pump,
 wherein the pump controller is configured to acquire an ambient temperature and estimates an estimated oil temperature according to the ambient temperature and the temperature of the coil, and determines a start timing of the electric oil pump according to the estimated oil temperature,
 wherein if the estimated oil temperature is lower than an activatable temperature of the electric oil pump, the pump controller estimates a temperature rising time for the oil temperature to reach the activatable temperature, and determines an activation waiting time to wait for activation of the electric oil pump according to the temperature rising time,
 wherein the pump controller estimates the temperature rising time according to power consumption of the motor and oil circulation volume of the motor unit,
 wherein if a difference between the coil temperature and the ambient temperature is less than 5 degrees Celsius, the pump controller determines the estimated oil temperature to be equal to the coil temperature.

2. A control device for a motor unit provided in a vehicle, wherein the motor unit comprises:
   a motor comprising a plurality of coils provided side by side around a motor axis;
   a transmission mechanism transmitting power of the motor to an axle;
   a housing housing the motor and the transmission mechanism;
   an electric oil pump delivering oil stored in the housing; and
   a coil temperature sensor detecting a temperature of the coil, the control device comprising:
   a motor controller driving and controlling the motor; and
   a pump controller driving and controlling the electric oil pump,
   wherein the pump controller is configured to acquire an ambient temperature and estimates an estimated oil temperature according to the ambient temperature and the temperature of the coil, and determines a start timing of the electric oil pump according to the estimated oil temperature,
   wherein if the estimated oil temperature is lower than an activatable temperature of the electric oil pump, the pump controller estimates a temperature rising time for the oil temperature to reach the activatable temperature, and determines an activation waiting time to wait for activation of the electric oil pump according to the temperature rising time,
   wherein the pump controller estimates the temperature rising time according to power consumption of the motor and oil circulation volume of the motor unit,
   wherein if the coil temperature is higher than the ambient temperature by 5 degrees Celsius or more, the pump controller determines the estimated oil temperature according to an initial estimated oil temperature when the vehicle is stopped, a vehicle soak time, and the ambient temperature.

3. A control device for a motor unit provided in a vehicle, wherein the motor unit comprises:
   a motor comprising a plurality of coils provided side by side around a motor axis;
   a transmission mechanism transmitting power of the motor to an axle;
   a housing housing the motor and the transmission mechanism;
   an electric oil pump delivering oil stored in the housing; and
   a coil temperature sensor detecting a temperature of the coil, the control device comprising:
   a motor controller driving and controlling the motor; and
   a pump controller driving and controlling the electric oil pump,
   wherein the pump controller is configured to acquire an ambient temperature and estimates an estimated oil temperature according to the ambient temperature and the temperature of the coil, and determines a start timing of the electric oil pump according to the estimated oil temperature,
   wherein if the estimated oil temperature is lower than an activatable temperature of the electric oil pump, the pump controller estimates a temperature rising time for the oil temperature to reach the activatable temperature, and determines an activation waiting time to wait for activation of the electric oil pump according to the temperature rising time,
   wherein if a difference between the coil temperature and the ambient temperature is less than 5 degrees Celsius, the pump controller determines the estimated oil temperature to be equal to the coil temperature.

4. A control device for a motor unit provided in a vehicle, wherein the motor unit comprises:
   a motor comprising a plurality of coils provided side by side around a motor axis;
   a transmission mechanism transmitting power of the motor to an axle;
   a housing housing the motor and the transmission mechanism;
   an electric oil pump delivering oil stored in the housing; and
   a coil temperature sensor detecting a temperature of the coil, the control device comprising:
   a motor controller driving and controlling the motor; and
   a pump controller driving and controlling the electric oil pump,
   wherein the pump controller is configured to acquire an ambient temperature and estimates an estimated oil temperature according to the ambient temperature and the temperature of the coil, and determines a start timing of the electric oil pump according to the estimated oil temperature,
   wherein if the estimated oil temperature is lower than an activatable temperature of the electric oil pump, the pump controller estimates a temperature rising time for the oil temperature to reach the activatable temperature, and determines an activation waiting time to wait for activation of the electric oil pump according to the temperature rising time
   wherein if the coil temperature is higher than the ambient temperature by 5 degrees Celsius or more, the pump controller determines the estimated oil temperature according to an initial estimated oil temperature when the vehicle is stopped, a vehicle soak time, and the ambient temperature.

5. A control device for a motor unit provided in a vehicle, wherein the motor unit comprises:
   a motor comprising a plurality of coils provided side by side around a motor axis;
   a transmission mechanism transmitting power of the motor to an axle;
   a housing housing the motor and the transmission mechanism;
   an electric oil pump delivering oil stored in the housing; and
   a coil temperature sensor detecting a temperature of the coil, the control device comprising:
   a motor controller driving and controlling the motor; and
   a pump controller driving and controlling the electric oil pump,
   wherein the pump controller estimates an oil temperature according to an ambient temperature and the temperature of the coil, and determines a start timing of the electric oil pump according to an estimated oil temperature,
   wherein the pump controller is configured to calculate a difference between the coil temperature and the ambient temperature.

6. The control device for the motor unit according to claim 5, wherein if the estimated oil temperature is lower than an activatable temperature of the electric oil pump, the pump controller estimates a temperature rising time for the oil temperature to reach the activatable temperature, and determines an activation waiting time to wait for activation of the electric oil pump according to the temperature rising time.

7. The control device for the motor unit according to claim 5, wherein the pump controller estimates the temperature rising time according to power consumption of the motor and oil circulation volume of the motor unit.

8. The control device for the motor unit according to claim 6, wherein the pump controller determines the estimated oil temperature to be equal to the coil temperature based on a calculation result of a difference between the coil temperature and the ambient temperature.

9. The control device for the motor unit according to claim 7, wherein the pump controller determines the estimated oil temperature according to an initial estimated oil temperature when the vehicle is stopped, a vehicle soak time, and the ambient temperature, and a calculation result of a difference between the coil temperature and the ambient temperature.

10. A control device for a motor unit provided in a vehicle, wherein the motor unit comprises:
   a motor comprising a plurality of coils provided side by side around a motor axis;
   a transmission mechanism transmitting power of the motor to an axle;
   a housing housing the motor and the transmission mechanism;
   an electric oil pump delivering oil stored in the housing; and
   a coil temperature sensor detecting a temperature of the coil, the control device comprising:
   a motor controller driving and controlling the motor; and
   a pump controller driving and controlling the electric oil pump,
wherein the pump controller is configured to acquire an ambient temperature and estimates an estimated oil temperature according to the ambient temperature and the temperature of the coil, and determines a start timing of the electric oil pump according to the estimated oil temperature,
wherein if the estimated oil temperature is lower than an activatable temperature of the electric oil pump, the pump controller estimates a temperature rising time for the oil temperature to reach the activatable temperature, and determines an activation waiting time to wait for activation of the electric oil pump according to the temperature rising time,
wherein the pump controller determines the estimated oil temperature to be equal to the coil temperature based on a calculation result of a difference between the coil temperature and the ambient temperature.

11. A control device for a motor unit provided in a vehicle, wherein the motor unit comprises:
   a motor comprising a plurality of coils provided side by side around a motor axis;
   a transmission mechanism transmitting power of the motor to an axle;
   a housing housing the motor and the transmission mechanism;
   an electric oil pump delivering oil stored in the housing; and
   a coil temperature sensor detecting a temperature of the coil, the control device comprising:
   a motor controller driving and controlling the motor; and
   a pump controller driving and controlling the electric oil pump,
wherein the pump controller is configured to acquire an ambient temperature and estimates an estimated oil temperature according to the ambient temperature and the temperature of the coil, and determines a start timing of the electric oil pump according to the estimated oil temperature,
wherein if the estimated oil temperature is lower than an activatable temperature of the electric oil pump, the pump controller estimates a temperature rising time for the oil temperature to reach the activatable temperature, and determines an activation waiting time to wait for activation of the electric oil pump according to the temperature rising time,
wherein the pump controller determines the estimated oil temperature according to an initial estimated oil temperature when the vehicle is stopped, a vehicle soak time, and the ambient temperature, and a calculation result of a difference between the coil temperature and the ambient temperature.

* * * * *